United States Patent
Cui et al.

(10) Patent No.: US 12,261,797 B2
(45) Date of Patent: Mar. 25, 2025

(54) SCHEDULING RESTRICTION AND INTERRUPTION FOR SRS ANTENNA PORT SWITCHING

(71) Applicant: Apple Inc., Cupertino, CA (US)

(72) Inventors: Jie Cui, San Jose, CA (US); Chunxuan Ye, San Diego, CA (US); Dawei Zhang, Saratoga, CA (US); Haitong Sun, Cupertino, CA (US); Hong He, San Jose, CA (US); Huaning Niu, San Jose, CA (US); Manasa Raghavan, Sunnyvale, CA (US); Qiming Li, Beijing (CN); Xiang Chen, Campbell, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/755,678

(22) PCT Filed: May 11, 2021

(86) PCT No.: PCT/CN2021/093122
§ 371 (c)(1),
(2) Date: May 5, 2022

(87) PCT Pub. No.: WO2022/236706
PCT Pub. Date: Nov. 17, 2022

(65) Prior Publication Data
US 2024/0163051 A1    May 16, 2024

(51) Int. Cl.
*H04L 5/00*    (2006.01)
*H04B 7/06*    (2006.01)
*H04W 72/21*   (2023.01)

(52) U.S. Cl.
CPC ......... *H04L 5/0051* (2013.01); *H04B 7/0626* (2013.01); *H04W 72/21* (2023.01)

(58) Field of Classification Search
CPC ....... H04L 5/0051; H04L 5/00; H04L 5/0048; H04L 5/14; H04W 72/21; H04W 74/00; H04W 74/08; H04W 72/23; H04B 7/0626
See application file for complete search history.

(56) References Cited

U.S. PATENT DOCUMENTS

| | | | | |
|---|---|---|---|---|
| 2020/0112355 A1* | 4/2020 | Park | ...................... | H04L 5/0094 |
| 2020/0204463 A1* | 6/2020 | Guan | .................... | G06F 21/604 |

(Continued)

FOREIGN PATENT DOCUMENTS

| | | |
|---|---|---|
| CN | 111835476 | 10/2020 |
| CN | 112136288 | 12/2020 |

(Continued)

OTHER PUBLICATIONS

Sony, "Summary of SRS", 3GPP TSG RAN WG1 Meeting #92, R1-1803410, Mar. 2, 2018, 31 sheets.

(Continued)

*Primary Examiner* — Mewale A Ambaye
(74) *Attorney, Agent, or Firm* — Fay Kaplun & Marcin, LLP

(57) ABSTRACT

A user equipment (UE) is configured to determine to perform a sounding reference signal (SRS) transmission with an antenna port switch operation, wherein the SRS transmission with the antenna port switch operation is performed during an SRS transmission occasion comprising one or more symbols of a slot and apply one or more scheduling restriction rules corresponding to the SRS transmission with the antenna port switch to provide one or more scheduling restrictions for the UE, wherein the scheduling restrictions cause the UE to omit performing at least one of transmission operations or reception operations during one or more symbols of the slot or one or more symbols of an adjacent slot.

20 Claims, 6 Drawing Sheets

(56) References Cited

U.S. PATENT DOCUMENTS

| | | | | |
|---|---|---|---|---|
| 2021/0345293 A1* | 11/2021 | Park | ............... | H04L 5/001 |
| 2022/0116172 A1* | 4/2022 | Tang | ............... | H04L 5/0098 |
| 2022/0322239 A1* | 10/2022 | Huang | ............... | H04B 7/0639 |
| 2023/0224824 A1* | 7/2023 | Jung | ............... | H04W 52/58 |
| | | | | 455/522 |

FOREIGN PATENT DOCUMENTS

| | | | | |
|---|---|---|---|---|
| CN | 112154699 | | 12/2020 | |
| WO | 2020/164589 | | 8/2020 | |
| WO | WO-2020164589 A1 * | 8/2020 | ........... | H04L 5/0007 |

OTHER PUBLICATIONS

Ericsson, "Remaining details on SRS design", 3GPP TSG RAN WG1 Meeting #91, R1-1720744, Dec. 1, 2017, 11 sheets.

* cited by examiner

SCHEDULING RESTRICTION AND INTERRUPTION FOR SRS ANTENNA PORT SWITCHING

BACKGROUND

A user equipment (UE) may transmit sounding reference signals (SRS). The SRS may be used for a variety of purposes but a typical purpose is for a base station with which the UE is communicating to determine the channel quality of the uplink path from the UE. In 5G networks, the UE may switch antenna ports when transmitting SRS so the base station may receive and determine the channel quality of different uplink paths. In 5G, it has also been decided that there will be no definition of a SRS antenna port switching delay requirement in the radio resource management (RRM). Because there is no delay requirement, there must be some other manner of handling the SRS with antenna port switching for the base station.

SUMMARY

Some exemplary embodiments are related to a processor of a user equipment (UE) configured to perform operations. The operations include determining to perform a sounding reference signal (SRS) transmission with an antenna port switch operation, wherein the SRS transmission with the antenna port switch operation is performed during an SRS transmission occasion comprising one or more symbols of a slot and applying one or more scheduling restriction rules corresponding to the SRS transmission with the antenna port switch to provide one or more scheduling restrictions for the UE, wherein the scheduling restrictions cause the UE to omit performing at least one of transmission operations or reception operations during one or more symbols of the slot or one or more symbols of an adjacent slot.

Other exemplary embodiments are related to a processor of a base station configured to perform operations. The operations include configuring a user equipment (UE) to perform a sounding reference signal (SRS) transmission with an antenna port switch operation, wherein the SRS transmission with the antenna port switch operation is performed during an SRS transmission occasion comprising one or more symbols of a slot and applying one or more scheduling restriction rules corresponding to the SRS transmission with the antenna port switch to provide one or more scheduling restrictions for the base station, wherein the scheduling restrictions cause the base station to omit performing at least one of transmission operations or reception operations related to the UE during one or more symbols of the slot or one or more symbols of an adjacent slot.

Still further exemplary embodiments are related to a processor of a user equipment (UE) configured to perform operations. The operations include determining to perform a sounding reference signal (SRS) transmission with an antenna port switch operation, determining interruption information related to the SRS transmission with the antenna port switching operation, wherein the interruption information comprises one of a band combination indication for reception in a downlink (DL) or a band combination indication for transmission in an uplink (UL) and reporting the interruption information to a network with which the UE is communicating.

DETAILED DESCRIPTION

Figure 1:
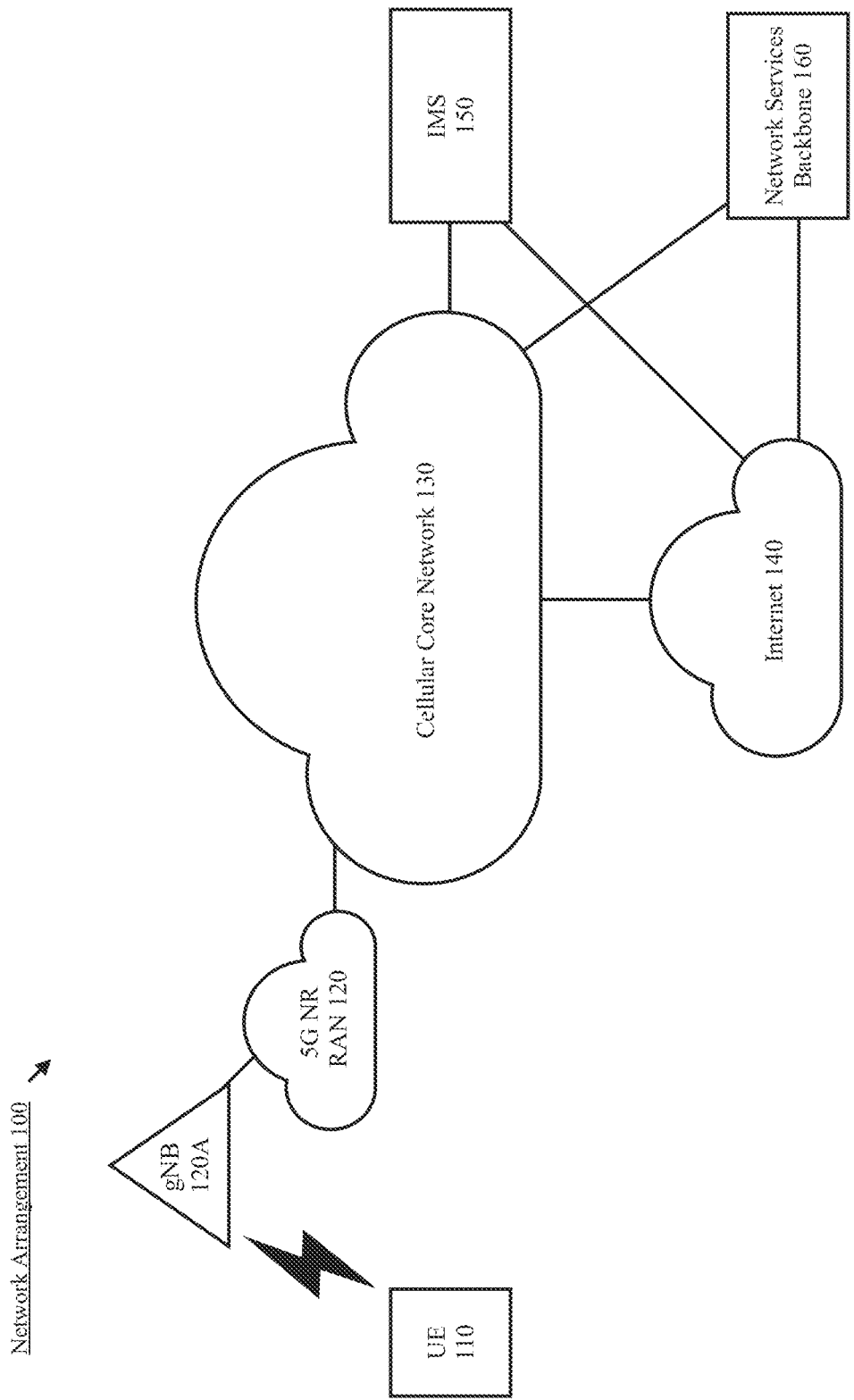
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to implementing scheduling restrictions for SRS antenna port switching. The exemplary embodiments further relate to implementing interruptions for SRS antenna port switching.

The exemplary embodiments are described with regard to a UE. However, reference to the term UE is merely provided for illustrative purposes. The exemplary embodiments may be utilized with any electronic component that is configured with the hardware, software, and/or firmware to exchange information (e.g., control information) and/or data with the network. Therefore, the UE as described herein is used to represent any suitable electronic device.

The exemplary embodiments are also described with regard to a 5G NR network that supports SRS and antenna switching. Those skilled in the art will understand that the exemplary techniques described herein may be used in conjunction with any network that supports SRS (or other type of reference signals) with antenna port switching.

As described above, in 5G networks, the UE may switch antenna ports when transmitting SRS so the base station may receive and determine the channel quality of different uplink paths. In 5G, it has also been decided that there will be no definition of a SRS antenna port switching delay requirement in the radio resource management (RRM).

Some exemplary embodiments are described with reference to the UE operating in frequency division duplexing (FDD) mode. However, it should be understood that all the exemplary embodiments may be applied to UEs operating in the FDD mode or in a time division duplexing (TDD) mode.

In one aspect, the exemplary embodiments include a set of rules to standardize scheduling restrictions for SRS with antenna port switching. As will be described in greater detail below, the standardized rules allow the UE and the base station associated with the SRS with antenna port switching to have a common understanding of the scheduling restrictions to which the UE will adhere during SRS transmission occasions.

A UE that supports SRS with antenna port switching may also report interruptions to the base station based on the antenna port switching. The interruption requirement should be defined based on the band combination capability reported by UE. For example, the band combination interruptions may be defined as a txSwitchImpactToRx that indicates the entry number of the first-listed band with uplink (UL) in the band combination that affects the downlink (DL) and txSwitchWithAnotherBand that indicates the entry number of the first listed band with UL in the band combination that switches together with the UL. However, it is not clear if the SRS antenna switching interruptions on both DL and UL applies to the band combinations signaled in txSwitchImpactToRx or txSwitchWithAnotherBand. Furthermore, the relation between per-frequency range (per-FR) capabilities and the interruption reporting should also be clarified.

In another aspect, the exemplary embodiments include various options for interruption reporting by the UE to the network. The options include determining whether band combinations in different frequency ranges should be reported to the network.

FIG. 1 shows an exemplary network arrangement 100 according to various exemplary embodiments. The exemplary network arrangement 100 includes the UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network arrangement 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long term evolution (LTE) RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the 5G NR RAN 120.

The 5G NR RAN 120 may be a portion of a cellular network that may be deployed by a network carrier (e.g., Verizon, AT&T, T-Mobile, etc.). The 5G NR RAN 120 may include, for example, cells or base stations (e.g., Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

Any suitable association procedure may be performed for the UE 110 to connect to the 5G NR RAN 120. For example, as discussed above, the 5G NR RAN 120 may be associated with a particular cellular provider where the UE 110 and/or the user thereof has a contract and credential information (e.g., stored on a SIM card). Upon detecting the presence of the 5G NR RAN 120, the UE 110 may transmit the corresponding credential information to associate with the 5G NR RAN 120. More specifically, the UE 110 may associate with a specific cell or base station (e.g., gNB 120A). As mentioned above, the use of the 5G NR RAN 120 is for illustrative purposes and any appropriate type of RAN may be used.

In addition to the 5G NR RAN 120, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. It may include the EPC and/or the 5GC. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
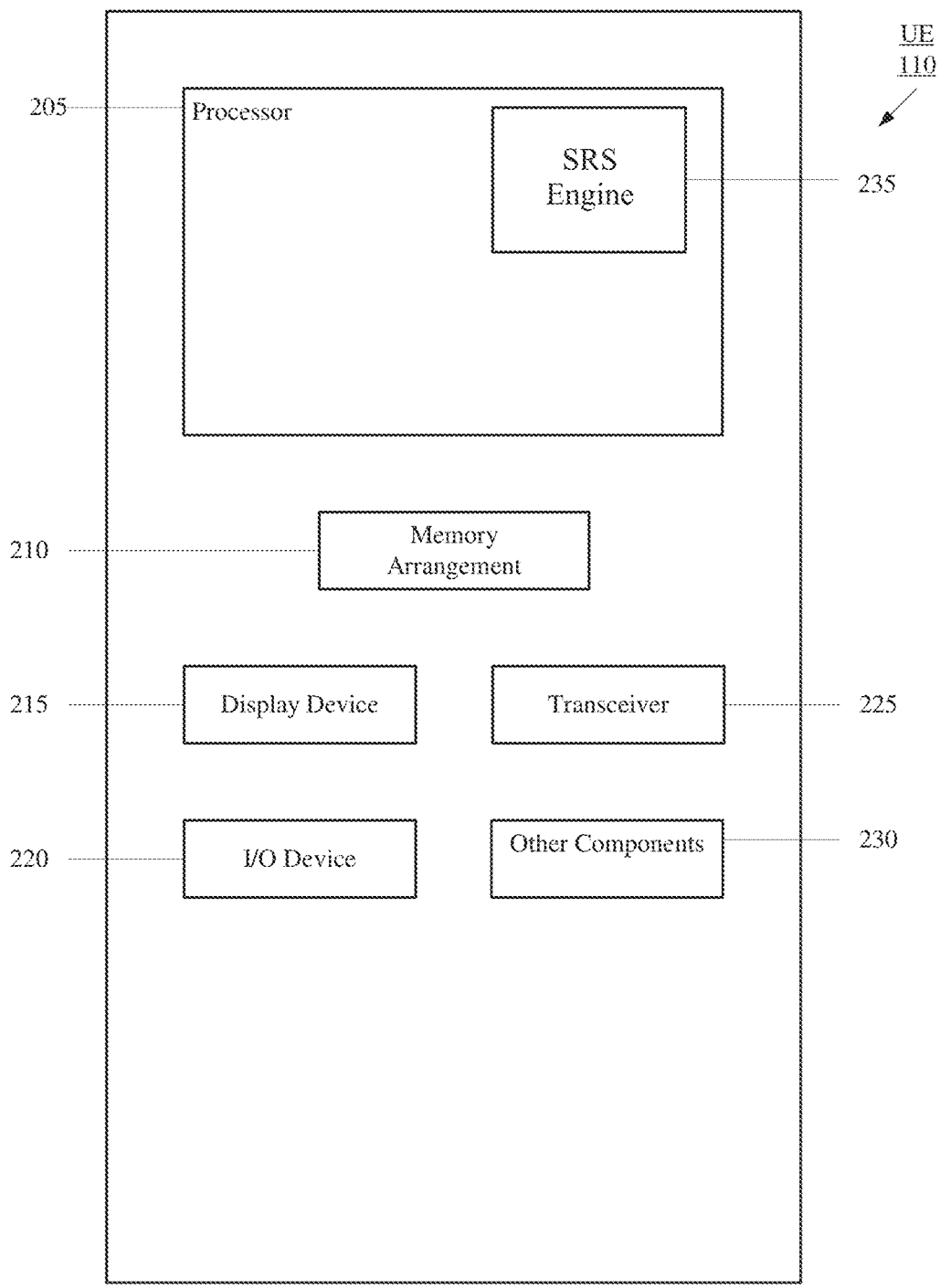
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include an SRS engine 235. The SRS engine 235 may perform various operations related to determining scheduling restrictions for the UE related to SRS transmissions with an antenna port switch. The SRS engine 235 may also perform various operations related to determining and reporting interruption information related to SRS transmissions with an antenna port switch. Exemplary embodiments of the operations for the scheduling restrictions and interruption information will be described in greater detail below.

The above referenced engine 235 being an application (e.g., a program) executed by the processor 205 is merely provided for illustrative purposes. The functionality associated with the engine 235 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

Figure 3:
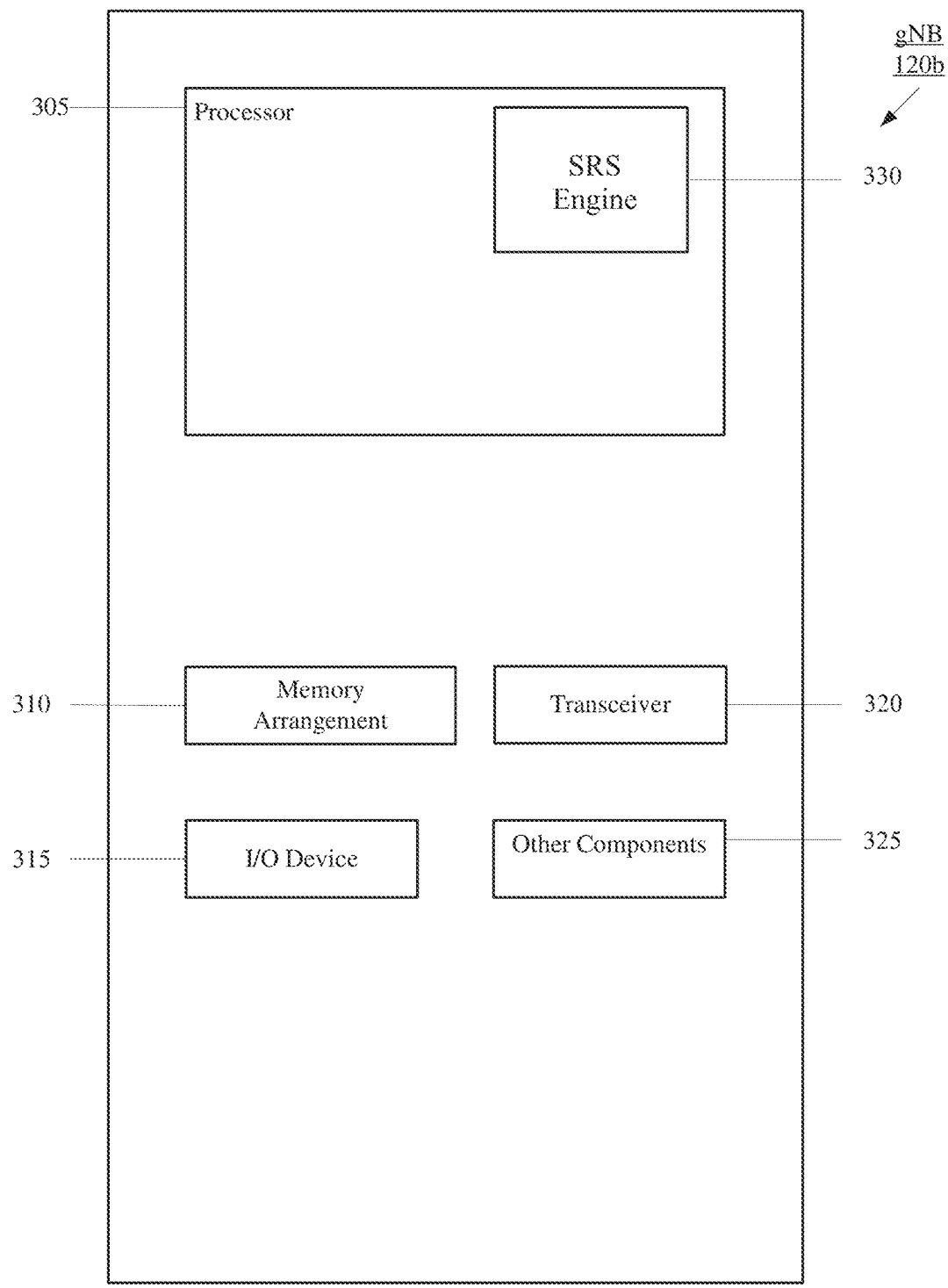
FIG. 3 shows an exemplary base station according to various exemplary embodiments.

FIG. 3 shows an exemplary base station 300 according to various exemplary embodiments. The base station 300 may represent any access node (e.g., gNB 120A) through which the UE 110 may establish a connection and manage network operations.

The base station 300 may include a processor 305, a memory arrangement 310, an input/output (I/O) device 315, a transceiver 320, and other components 325. The other components 325 may include, for example, a battery, a data acquisition device, ports to electrically connect the base station 300 to other electronic devices, etc.

The processor 305 may be configured to execute a plurality of engines of the base station 300. For example, the engines may include an SRS engine 330. The SRS engine 330 may be configured to instruct the UE 110 to perform SRS transmissions with an antenna port switch and determine UE scheduling restrictions related to the SRS transmissions with an antenna port switch. Exemplary embodiments of the operations for the scheduling restrictions will be described in greater detail below.

The above noted engine 330 being an application (e.g., a program) executed by the processor 305 is only exemplary. The functionality associated with the engine 330 may also be represented as a separate incorporated component of the base station 300 or may be a modular component coupled to the base station 300, e.g., an integrated circuit with or without firmware. For example, the integrated circuit may include input circuitry to receive signals and processing circuitry to process the signals and other information. In addition, in some base stations, the functionality described for the processor 305 is split among a plurality of processors (e.g., a baseband processor, an applications processor, etc.). The exemplary embodiments may be implemented in any of these or other configurations of a base station.

The memory 310 may be a hardware component configured to store data related to operations performed by the base station 300. The I/O device 315 may be a hardware component or ports that enable a user to interact with the base station 300. The transceiver 320 may be a hardware component configured to exchange data with the UE 110 and any other UE in the system 100. The transceiver 320 may operate on a variety of different frequencies or channels (e.g., set of consecutive frequencies). Therefore, the transceiver 320 may include one or more components (e.g., radios) to enable the data exchange with the various networks and UEs.

As described above, one manner of handling the SRS with antenna port switching is to include a scheduling restriction before and after SRS transmissions for the cell with SRS antenna port switching. The scheduling restriction may include that the UE is not to transmit any Physical Uplink Control Channel (PUCCH) transmissions, Physical Uplink Shared Channel (PUSCH) transmissions or SRS during the scheduling restriction period. In addition, the scheduling restriction may include the UE not receiving Synchronization Signal Block (SSB) transmissions, Physical Downlink Control Channel (PDCCH) transmissions, Physical Downlink Shared Channel (PDSCH) transmissions, Tracking Reference Signals (TRS) or Channel State Information-Reference Signals (CSI-RS) during the scheduling restriction period. The above provided various examples of the types of signals (transmitted and received) that may be restricted by the UE during the scheduling restriction. However, it should be understood that this list is not exhaustive and other types of signals may also be restricted.

However, the scheduling restrictions should be standardized so that all UEs and all base stations understand the scheduling restrictions. Specifically, the UEs and the base stations need to understand when the scheduling restrictions are used, e.g., the scheduling restriction period. In some exemplary embodiments described herein, standardized scheduling restriction rules are applied for the SRS with antenna switching to define when the UE is restricted from performing the above exemplary transmissions and reception operations. The exemplary standardized rules and some exemplary implementations are described below. It should be understood that while the below exemplary restriction rules are described individually, the rules may be applied individually, as a complete group or as any combination of two or more rules.

Figure 4:
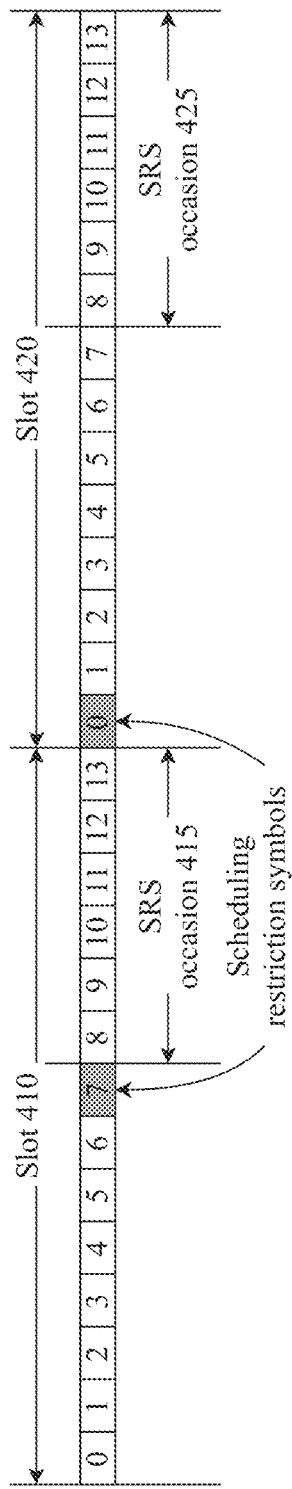
FIG. 4 shows an exemplary slot diagram including SRS with antenna port switching including a first exemplary scheduling restriction rule according to various exemplary embodiments.

FIG. 4 shows an exemplary slot diagram 400 including SRS with antenna port switching including a first exemplary scheduling restriction rule according to various exemplary embodiments. Prior to describing the exemplary scheduling restriction rule, the exemplary slot diagram 400 will be described. It should be understood that the description of the slot diagram 400 is also applicable to the slot diagrams 500 and 600 of FIGS. 5 and 6, respectively.

In the exemplary slot diagram 400, there are two slots illustrated, slot 410 and slot 420. Each of the slots 410 and 420 include fourteen (14) symbols labelled as 0-13 in the slot diagram 400. In this example, it may be considered that the SRS occasions 415 and 425 that correspond to the slots 410 and 420, respectively, comprise six (6) symbols (e.g., symbols 8-13). However, those skilled in the art will understand that the SRS transmission occasion may include any of 1-6 symbols within the last six (6) symbols of a slot. Thus, a six (6) slot SRS transmission occasion is only exemplary. Again, as those skilled in the art will understand, an SRS transmission occasion is a symbol on which the UE will transmit an SRS.

The first exemplary scheduling restriction rule may be that there is a scheduling restriction for one (1) data symbol before the SRS transmission occasion and one (1) data symbol after the SRS transmission occasion. The slot diagram 400 shows an example of this scheduling restriction. As described above, the SRS transmission occasion 415 includes six (6) symbols (8-13). Thus, one (1) symbol before the SRS transmission occasion 415 is symbol 7 of slot 410 and one (1) symbol after the SRS transmission occasion 415 is symbol (0) of the slot 420. According to the first exemplary scheduling restriction rule the UE will not transmit or receive the above described exemplary signals during the symbol 7 of slot 410 and symbol (0) of the slot 420.

Figure 5:
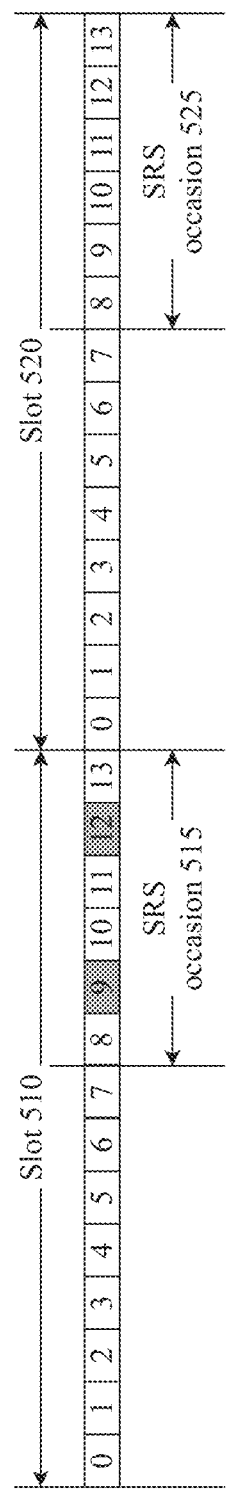
FIG. 5 shows an exemplary slot diagram including SRS with antenna port switching including a second exemplary scheduling restriction rule according to various exemplary embodiments.

FIG. 5 shows an exemplary slot diagram 500 including SRS with antenna port switching including a second exemplary scheduling restriction rule according to various exemplary embodiments. Similar to FIG. 4, in the exemplary slot diagram 500 there are two slots illustrated, slot 510 and slot 520. Each of the slots 510 and 520 include fourteen (14) symbols labelled as 0-13 in the slot diagram 500. In this example, it may be considered that the SRS occasions 515 and 525 that correspond to the slots 510 and 520, respectively, comprise six (6) symbols (e.g., symbols 8-13).

The second exemplary scheduling restriction rule may be that there is a scheduling restriction on symbols for SRS transmission for antenna port switching, e.g., the symbols that are used to transmit the SRS are restricted. The slot diagram 500 shows an example of this scheduling restriction. As described above, the SRS transmission occasion 515 includes six (6) symbols (8-13). In this example, it may be considered that symbols 9 and 12 of the slot 510 are being used by the UE to transmit the SRS with antenna port switching. Thus, the UE will not transmit or receive the above described exemplary signals during the symbols 9 and 12 of the slot 510. The remaining symbols of the SRS transmission occasion 515 may be available for other transmissions and/or receptions (subject to any other restriction rules, one of which will be described below).

Figure 6:
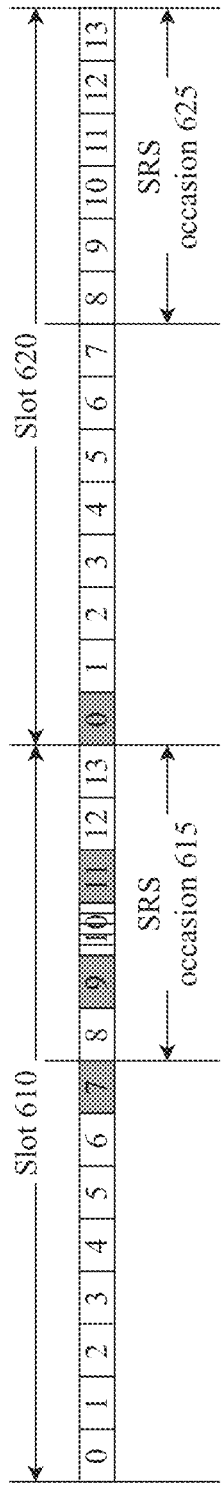
FIG. 6 shows an exemplary slot diagram including SRS with antenna port switching including a third exemplary scheduling restriction rule according to various exemplary embodiments.

FIG. 6 shows an exemplary slot diagram 600 including SRS with antenna port switching including a third exemplary scheduling restriction rule according to various exemplary embodiments. Similar to FIG. 4, in the exemplary slot diagram 600 there are two slots illustrated, slot 610 and slot 620. Each of the slots 610 and 620 include fourteen (14) symbols labelled as 0-13 in the slot diagram 600. In this example, it may be considered that the SRS occasions 615 and 625 that correspond to the slots 610 and 620, respectively, comprise six (6) symbols (e.g., symbols 8-13).

The third exemplary scheduling restriction rule may be that there is a scheduling restriction on symbols for an SRS antenna port switching guard period. In some exemplary embodiments, the guard period may be considered to be one (1) symbol before and one (1) symbol after the symbol for the SRS transmission. Those skilled in the art will understand that when antenna port switching occurs, there is a time associated with the hardware switching where the UE cannot receive or transmit information. This time is typically less than one (1) symbol. However, the use of one (1) symbol for the antenna port switching ensures that the UE will not miss any transmissions and/or receptions during the switching time.

The slot diagram 600 shows an example of this scheduling restriction. As described above, the SRS transmission occasion 515 includes six (6) symbols (8-13). In this example, it may be considered that symbol 10 of the slot 510 is being used by the UE to transmit the SRS with antenna port switching. Thus, one (1) symbol before the SRS transmission is symbol 9 of slot 410 and one (1) symbol after the SRS transmission is symbol 11 of the slot 410. Thus, the UE will not transmit or receive the above described exemplary signals during the symbols 9 and 11 of the slot 510. Combined with the second exemplary restriction rule, the UE will not transmit or receive the above described exemplary signals during the symbols 9, 10 and 11 of the slot 510.

Figure 7:
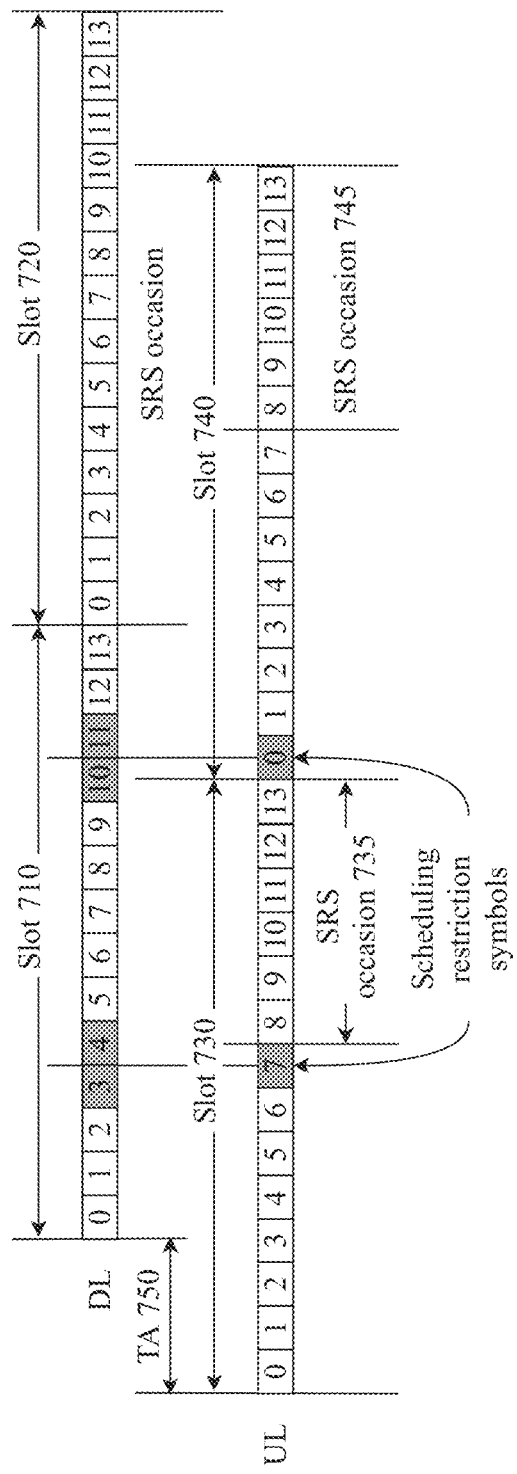
FIG. 7 shows an exemplary slot diagram including SRS with antenna port switching including a fourth exemplary scheduling restriction rule that applies to a UE operating in frequency division duplexing (FDD) mode according to various exemplary embodiments.

FIG. 7 shows an exemplary slot diagram 700 including SRS with antenna port switching including a fourth exemplary scheduling restriction rule that applies to a UE operating in frequency division duplexing (FDD) mode according to various exemplary embodiments. Initially, FIG. 7 shows two slots in the downlink (DL), slot 710 and slot 720 and two slots in the uplink (UL), slot 730 and slot 740 for a UE operating in FDD mode. Again, each of the slots 710-740 include fourteen (14) symbols labelled as 0-13 in the slot diagram 700. In this example, it may be considered that the UL slots 730 and 740 have SRS occasions 735 and 745, respectively, and each comprise six (6) symbols (e.g., symbols 8-13). The UL slots and the DL slots are offset from each other by a Timing Advance (TA) 750, thus the time of the corresponding symbols of the UL slots and the DL slots are offset, e.g., UL slot 730 symbol 0 is offset from DL slot 710 symbol 0 by the TA 750.

It can be seen that if the above exemplary rules were applied to the case where there is a TA between the UL and DL slots, the UE may schedule the restriction for the wrong DL slots. To provide an example, consider the first exemplary restriction rule described above that states that there is a scheduling restriction for one (1) data symbol before the SRS transmission occasion and one (1) data symbol after the SRS transmission occasion. As illustrated in signaling diagram 700, this exemplary rule would result in a restriction on transmitting in the UL for slots symbol 7 of slot 730 and symbol 0 of the slot 740. However, the same restriction should not be applied in the DL to the symbol 7 of slot 710 and symbol 0 of the slot 720 because these slots do not align with the same slots in the UL.

Thus, a fourth exemplary scheduling restriction rule may be that for FDD carriers, the UE should apply restrictions to the DL symbols that are overlapped with the symbols that are restricted in the UL, e.g., any of the symbols that are restricted in the UL based on any of the exemplary first through third rules described above. To carry through with the example started above, it can be seen in signaling diagram 700 that the DL symbols 3 and 4 of the slot 710 at least partially overlap with the UL symbol 7 of slot 730 that is restricted. Similarly, the DL symbols 10 and 11 of the slot 710 at least partially overlap with the UL symbol 0 of slot 740 that is restricted. Thus, the UE will apply the reception restriction to the DL symbols 3, 4, 10 and 11 of the slot 710 based on the fourth exemplary restriction rule.

In some exemplary embodiments, the fourth rule may be extended to include the DL symbols that are overlapped with the symbols that are restricted in the UL based on the first or third rule plus a transient time for SRS antenna port switching. As described above, there is a time associated with the actual switching of the antenna ports. This time may be defined as a transient time, e.g., 10-15 microseconds. This transient time may be added to before and after the time of the restricted symbols in the UL and any DL symbols that overlap the combination of the transient time and the restricted UL symbols may also be restricted.

The above exemplary rules have been described from the standpoint of the UE. However, it should be understood that the base station involved in the SRS with antenna port switch operation with the UE may also apply these rules. In this manner the base station will understand when the UE is not performing transmission and reception operations so that UE neither transmits information specifically for the UE during these times or expects to receive a transmission from the UE during these scheduling restrictions.

Figure 8:
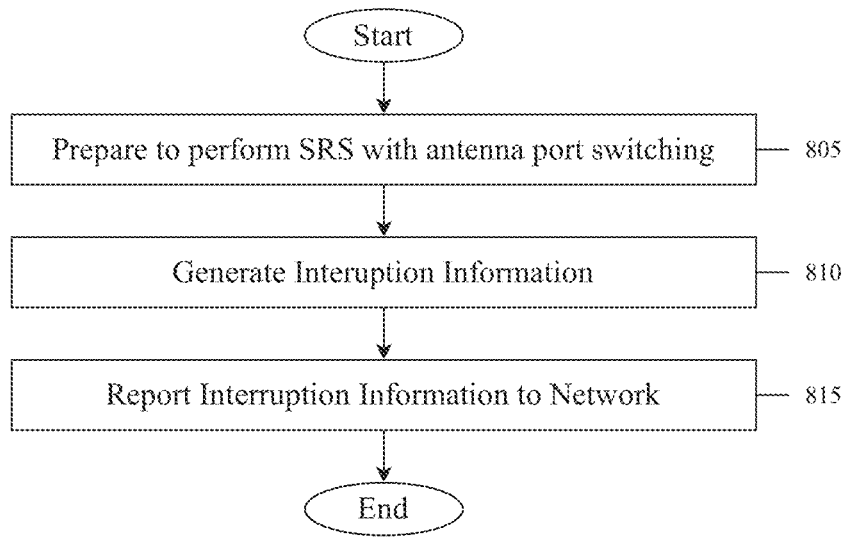
FIG. 8 shows an exemplary method for a UE to report interruptions to the network for SRS with antenna port switching according to various exemplary embodiments.

FIG. 8 shows an exemplary method 800 for a UE to report interruptions to the network for SRS with antenna port switching according to various exemplary embodiments. As described above, the UE may report band combination interruptions based on the antenna port switching to the network, e.g., transmitting the SRS using the antenna port may affect other transmissions/receptions being performed by the UE on other frequencies. As also described above, these band combination interruptions may be reported using the information elements (IE) txSwitchImpactToRx or txSwitchWithAnotherBand. However, it should be understood that these IEs are only exemplary and other IEs may be used to report the interruption information.

In 805, the UE prepares to perform SRS with antenna port switching. Thus, the UE will understand the frequency associated with the SRS transmissions. In 810, the UE will generate the interruption information for the band combinations that are affected by the SRS with antenna port switching. As will be described in greater detail below, there are various options as to how the interruption information may be generated.

In a first option, if the UE supports a per-FR measurement gap (MG) capability, the UE may only indicate the band combination of txSwitchImpactToRx or txSwitchWithAnotherBand in the same frequency range. Otherwise, if UE does not support a per-FR MG capability, the UE may indicate the band combination of txSwitchImpactToRx or txSwitchWithAnotherBand in different frequency ranges.

In the first option, a UE that supports per-FR MG capability does not need to report interruptions for a different frequency range from the frequency range for the antenna port switch because the UE will be configured with a measurement gap for that different frequency range.

In a second option, if per-FR MG capability is used in a band combination manner, e.g., the UE supports per-FR MG between band A on frequency range x (FRx) and band B on FRy, the band combination of per-FR MG capability may not be indicated in any of txSwitchImpactToRx or txSwitchWithAnotherBand indication for SRS antenna port switching. Thus, for this second option, the txSwitchImpactToRx and txSwitchWithAnotherBand indication for SRS antenna port switching may only include the band combinations which are not indicated in per-FR MG capable band combinations of the UE.

In a third option, the band combination indication in the txSwitchImpactToRx or txSwitchWithAnotherBand may overwrite the UE capability of per-FR MG on this band combination. For example, as long as the band combination (e.g., band A and B) is indicated in txSwitchImpactToRx or txSwitchWithAnotherBand, the interruption may be applied on the victim band B when the UE is performing SRS antenna port switching on band A regardless of whether bands A and B are cross FR or not.

In a fourth option, the band combination indication in the txSwitchImpactToRx or txSwitchWithAnotherBand would be overwritten by the UE capability of per-FR MG on this band combination. For example, even though the band combination (e.g. band A and B) is indicated in txSwitchImpactToRx or txSwitchWithAnotherBand, no interruption would be applied on the victim band B when UE is performing SRS antenna port switching on band A when the UE indicates support for the per-FR MG capability and bands A and B are cross FR.

After the UE determines the interruption information in 810, the UE may then report the interruption information to the network in 815.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
   determining to perform a sounding reference signal (SRS) transmission with an antenna port switch operation, wherein the SRS transmission with the antenna port switch operation is performed during an SRS transmission occasion comprising one or more symbols of a slot;
   generating, for transmission to a base station, a txSwitchImpactToRX information element (IE) or a txSwitchWithAnotherBand IE indicating one or more band combinations that are to be interrupted by the antenna switch port operation; and
   applying one or more scheduling restriction rules corresponding to the SRS transmission with the antenna port switch to provide one or more scheduling restrictions for the UE,
   wherein the scheduling restrictions cause the UE to omit performing at least one of transmission operations or reception operations during one or more symbols of the slot or one or more symbols of an adjacent slot.

2. The processor of claim 1, wherein the transmission operations that are omitted comprise one of Physical Uplink Control Channel (PUCCH) transmission, Physical Uplink Shared Channel (PUSCH) transmission or sounding reference signals transmission.

3. The processor of claim 1, wherein the reception operations that are omitted comprise one of Synchronization Signal Block (SSB) reception, Physical Downlink Control Channel (PDCCH) reception, Physical Downlink Shared Channel (PDSCH) reception, Tracking Reference Signals (TRS) reception or Channel State Information-Reference Signals (CSI-RS) reception.

4. The processor of claim 1, wherein the scheduling restriction rules comprise a scheduling restriction for one symbol before the SRS transmission occasion and/or one symbol after the SRS transmission occasion.

5. The processor of claim 4, wherein the one symbol before the SRS transmission occasion is in the same slot as the transmission occasion and the one symbol after the SRS transmission occasion is in one of the same slot as the transmission occasion or the adjacent slot.

6. The processor of claim 1, wherein the scheduling restriction rules comprise a scheduling restriction for symbols of the SRS transmission occasion that the UE uses to transmit the SRS.

7. The processor of claim 6, wherein the scheduling restriction rules comprise a scheduling restriction for one symbol before and one symbol after each of the symbols of the SRS transmission occasion that the UE uses to transmit the SRS.

8. The processor of claim 1,
wherein the UE is operating in a frequency division duplexing (FDD) mode where uplink (UL) slots are offset from downlink (DL) slots by a timing advance (TA), and
wherein the scheduling restriction rules comprise a scheduling restriction for symbols of DL slots that at least partially overlap any symbols of UL slots that have a scheduling restriction.

9. The processor of claim 1,
wherein the UE is operating in a frequency division duplexing (FDD) mode where uplink (UL) slots are offset from downlink (DL) slots by a timing advance (TA), and
wherein the scheduling restriction rules comprise a scheduling restriction for symbols of DL slots that at least partially overlap any symbols of UL slots that have a scheduling restriction and a transient time before and a transient time after the symbols of UL slots that have the scheduling restriction.

10. The processor of claim 1, wherein the UE is operating in a time division duplexing (TDD) mode.

11. A processor of a base station configured to perform operations comprising:
generating, for transmission to a user equipment (UE), instructions for the UE to perform a sounding reference signal (SRS) transmission with an antenna port switch operation, wherein the SRS transmission with the antenna port switch operation is performed during an SRS transmission occasion comprising one or more symbols of a slot;
generating, for transmission to a base station, a txSwitchImpactToRX information element (IE) or a txSwitchWithAnotherBand IE indicating one or more band combinations that are to be interrupted by the antenna switch port operation; and
applying one or more scheduling restriction rules corresponding to the SRS transmission with the antenna port switch to provide one or more scheduling restrictions for the base station,
wherein the scheduling restrictions cause the base station to omit performing at least one of transmission operations or reception operations related to the UE during one or more symbols of the slot or one or more symbols of an adjacent slot.

12. The processor of claim 11, wherein the reception operations that are omitted comprise one of Physical Uplink Control Channel (PUCCH) reception, Physical Uplink Shared Channel (PUSCH) reception or sounding reference signals reception.

13. The processor of claim 11, wherein the transmission operations that are omitted comprise one of Synchronization Signal Block (SSB) transmission, Physical Downlink Control Channel (PDCCH) transmission, Physical Downlink Shared Channel (PDSCH) transmission, Tracking Reference Signals (TRS) transmission or Channel State Information-Reference Signals (CSI-RS) transmission.

14. The processor of claim 11, wherein the scheduling restriction rules comprise a scheduling restriction for one symbol before the SRS transmission occasion and one symbol after the SRS transmission occasion.

15. The processor of claim 14, wherein the one symbol before the SRS transmission occasion is in the same slot as the transmission occasion and/or the one symbol after the SRS transmission occasion is in one of the same slot as the transmission occasion or the adjacent slot.

16. The processor of claim 11, wherein the scheduling restriction rules comprise a scheduling restriction for symbols of the SRS transmission occasion that the UE uses to transmit the SRS.

17. The processor of claim 16, wherein the scheduling restriction rules comprise a scheduling restriction for one symbol before and one symbol after each of the symbols of the SRS transmission occasion that the UE uses to transmit the SRS.

18. The processor of claim 11,
wherein the base station and UE are operating in a frequency division duplexing (FDD) mode where uplink (UL) slots are offset from downlink (DL) slots by a timing advance (TA), and
wherein the scheduling restriction rules comprise a scheduling restriction for symbols of DL slots that at least partially overlap any symbols of UL slots that have a scheduling restriction.

19. The processor of claim 11,
wherein the base station and the UE are operating in a frequency division duplexing (FDD) mode where uplink (UL) slots are offset from downlink (DL) slots by a timing advance (TA), and
wherein the scheduling restriction rules comprise a scheduling restriction for symbols of DL slots that at least partially overlap any symbols of UL slots that have a scheduling restriction and a transient time before and a transient time after the symbols of UL slots that have the scheduling restriction.

20. The processor of claim 11, wherein the base station and the UE are operating in a time division duplexing (TDD) mode.

* * * * *